United States Patent [19]
Pottorff

[11] Patent Number: 6,148,710
[45] Date of Patent: Nov. 21, 2000

[54] SLITTER-PUNCH WITH QUICK ADAPTER

[75] Inventor: Earl T. Pottorff, Savannah, N.Y.

[73] Assignee: Pearl Technologies, Inc., Savannah, N.Y.

[21] Appl. No.: 09/354,918

[22] Filed: Jul. 12, 1999

[51] Int. Cl.⁷ .............................. B26D 1/14; B26D 5/08
[52] U.S. Cl. ................... 83/682; 83/620; 83/618; 83/697; 83/698.11; 83/698.71; 83/698.91; 403/381; 403/341; 403/391; 403/385
[58] Field of Search .............................. 83/620, 682, 618, 83/697, 698.11, 698.71, 698.91; 403/381, 341, 391, 385

[56] References Cited

U.S. PATENT DOCUMENTS

| | | | |
|---|---|---|---|
| 3,421,187 | 1/1969 | Ryder | 403/391 |
| 3,709,082 | 1/1973 | Leska | 83/618 |
| 3,802,308 | 4/1974 | Davis, Jr. | 83/99 |
| 3,973,453 | 8/1976 | Tameo | 83/30 |
| 4,449,434 | 5/1984 | Johnson | 83/98 |
| 4,461,411 | 7/1984 | Harrow | 224/208 |
| 4,611,484 | 9/1986 | MacKissinger, Jr. et al. | 83/698 |
| 4,723,466 | 2/1988 | Pottorff | 83/128 |
| 4,919,558 | 4/1990 | Mascitelli et al. | 403/381 |
| 5,035,165 | 7/1991 | Madsen | 83/618 |
| 5,114,394 | 5/1992 | Madsen | 493/277 |
| 5,862,729 | 1/1999 | Rolon et al. | 83/23 |

Primary Examiner—M. Rachuba
Assistant Examiner—Sean Pryor
Attorney, Agent, or Firm—Bernard P. Molldrem, Jr.

[57] ABSTRACT

A slitter-and-hole-punch and quick change adapter combination fits a bag machine or the like for punching holes and slits in a web of film material. A hole punch and a slitter blade are unitarily formed on a base member. Left and right resilient arms extend from distal to proximal, and have free ends that project proximally of the base member. The quick adapter can be an extruded block with a T-channel formed on a lower side with a passage or gap to accommodate the hole punch and the slitter blade. The T-channel has inwardly directed flanges that create side recesses to accommodate the resilient arms of the slitter-and-hole-punch. The side recesses have cooperating hollows to receive detents of the associated resilient arm. The slitter-and-hole-punch can be slid in and out of the T-slot, and when slid in, the detents on the resilient arms keep it in position. The slitter-and-hole-punch can be changed out in a few seconds by hand. The slitter-and-hole-punch units can be color coded, e.g., for gap size.

6 Claims, 3 Drawing Sheets

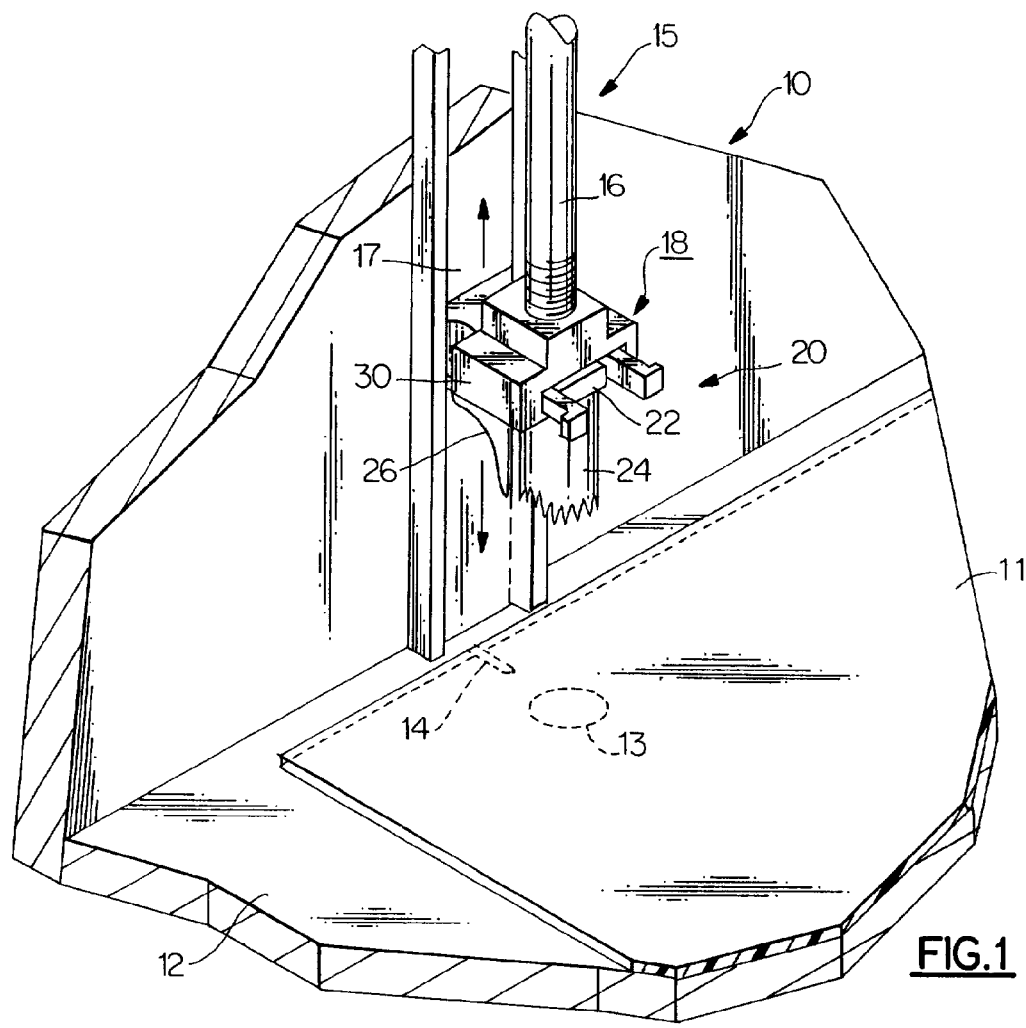
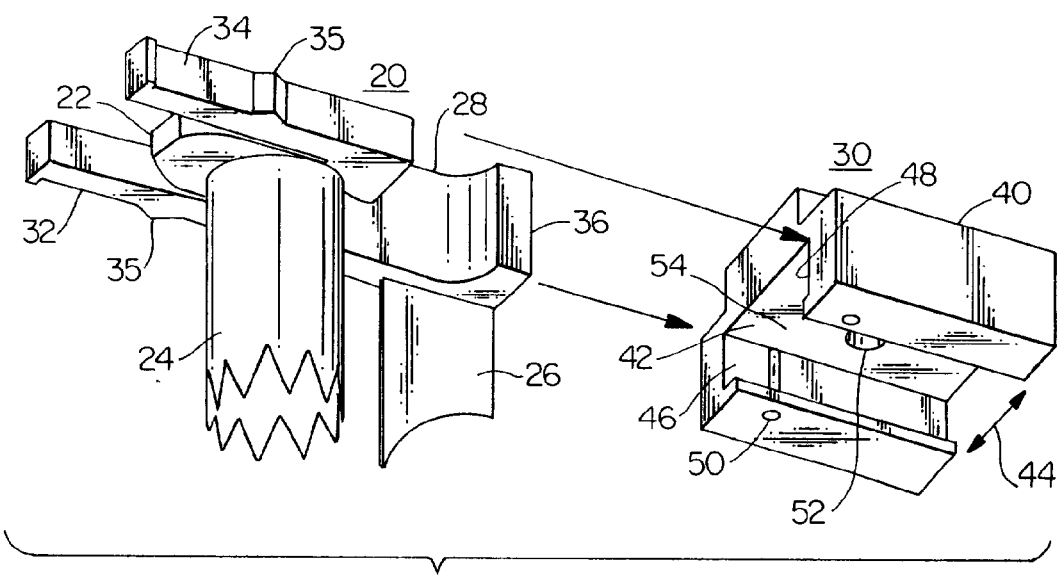

6,148,710

SLITTER-PUNCH WITH QUICK ADAPTER

BACKGROUND OF THE INVENTION

The present invention relates to punches and apparatus for perforating film material such as polyethylene film or other films made of plastic resin. The invention is more particularly directed to an improved slitter-punch and adapter combination for such apparatus in which the slitter blade and hole punch are formed as a unit, and can be changed out quickly and replaced with a minimum of machine down time.

Currently, blades and cutters for forming holes and slits in plastic film material are separately provided. For example, in my prior U.S. Pat. Nos. 4,748,920 and 4,723,466, apparatus are described for punching holes in plastic film material and also cutting a tear slit in the material. In that case there is a self-sharpening hole punch formed of a low-friction, semi-rigid material, such as Delrin or a similar polymer. The hole punch has a thread at its upper end for screw mounting onto reciprocating apparatus, which may be actuated by a pneumatic cylinder. Slit cutters are separately mounted on the reciprocating mechanism and spaced a small distance from the hole punch to create a gap in the film between the resulting hole and slit.

A so-called quick-slip punch adapter for a plastic bag making machine is described in U.S. Pat. Nos. 5,035,165 and 5,114,394. In that arrangement, a slitter blade is held in a clamp that also fastens to the shaft or rod that holds a hole cutter. However, the slitter blade is a separate element and has to be changed out separately from the hole punch. Also, this requires the operator to employ tools to remove the worn blades and punches, and to replace them with fresh ones. This operation can take several minutes for each hole punch and slitter blade. As there are several of these on each bag machine, considerable down time may be required to replace the worn blades and cutters.

Also, when the space between the slitter blade and the hole punch is to be changed, this must be done by hand and the gap between the slitter and the hole punch must be carefully measured. Moreover, the slitter blade itself has always been made of steel, and suffers the problems of dulling and wear that characterize steel cutting heads, which problem is discussed in the above-mentioned U.S. Pat. Nos. 4,748,920 and 4,723,466. Consequetly, the industry has long sought a solution to the problem of how to effect rapid change out of both hole punch and slitter blade, how to effect proper alignment of the parts in the desired spacing, and how to increase the wear life of the parts.

OBJECTS AND SUMMARY OF THE INVENTION

Accordingly, it is an object of this invention to provide a cutter head arrangement that combines the hole punch and slitter blade in a fashion that avoids the drawbacks of the prior art.

It is another object of the invention to provide a combination hole punch and slitter that is formed as a unit, and an adapter or holder that permits the combination slitter-punch to be changed out and replaced in a few seconds and without requiring special tools.

It is a further object to provide a combination slitter-punch and adapter that can be produced at relatively low cost, and that have an increased wear life over the prior art.

It is yet another object to provide slitter-punches that are color coded as to the pre-set gap between their punch and slitter blade.

According to an aspect of the present invention, a slitter-and-hole-punch and quick change adapter combination serves as a slitter punch cutting head for a bag machine or similar apparatus for punching holes and slits in a web of film material. The apparatus employs an apertured backing plate on which the film is supported and a reciprocating mechanism for holding the slitter punch cutting head in registered alignment with the film and with corresponding apertures in said backing plate. The reciprocating mechanism uses an air cylinder or the like for moving the slitter punch cutting head in the vertical direction (i.e., substantially normal to the backing plate). In this arrangement, the slitter-and-hole-punch is a unitarily formed member, e.g., molded of a durable semi-rigid plastic resin, and includes a base member, a hole punch, a slitter blade, and left and right resilient arms unitarily formed at left and right sides of the base member. The hole punch and the slitter blade are each unitarily formed with the base member and extend downward (in the direction towards the apertured plate) with the slitter blade being positioned distally of the hole punch. The left and right resilient arms extend from distal to proximal, and have free ends that project proximally of the base member. Each resilient arm has a detent member formed on it. The base and resilient arms define a generally bar-shaped profile across the proximal-distal direction thereof.

The quick adapter can be in the form of a block having means thereon (e.g., a threaded aperture) for attaching to the reciprocating mechanism, and a T-channel formed on a lower side and extending from the proximal end to the distal end. The T-channel has a passage on the downward facing side that is of sufficient width to accommodate the hole punch and the slitter blade. The T-channel has inwardly directed flanges that create side recesses to accommodate the resilient arms of the slitter-and-hole-punch. The side recesses each having a cooperating hollow formed therein to receive the detent the associated resilient arm.

The slitter-and-hole-punch can be slid in and out of the T-slot, and when slid in, the detents on the resilient arms keep it in position. The slitter-and-hole-punch can be removed by hand, by pinching the protruding ends of resilient arms to release the detents from the hollows, and then sliding it out. This permits the slitter and punch to be changed out as a unit in a few seconds, and does not require the operator to use any special tools. This also permits the operator to perform the change-over operation without placing his or her hand beneath the cutting edges, increases operator safety.

An assortment of slitter-and-hole-punch units can be provided with different diameter hole punches and with different size gaps between the slitter blade and the hole punch. Because these units are molded of plastic, they can be color-coded by gap size, or by the size of the barrel of the hole punch, or both. The color coding also permits the operator to visually check the gap size or punch size without having to stop the machine to measure.

The above and many other objects, features, and advantages of this invention will become apparent from the ensuing description of an exemplary embodiment, which should be read in conjunction with the accompanying Drawing.

BRIEF DESCRIPTION OF THE DRAWING

FIG. 1 is a perspective view of apparatus for creating punched holes and slits in a plastic film, and which carries the slitter punch and quick adapter of an embodiment of this invention.

FIG. 2 is an assembly view of the slitter punch and quick adapter of this embodiment.

DETAILED DESCRIPTION OF THE PREFERRED EMBODIMENTS

Figure 3:
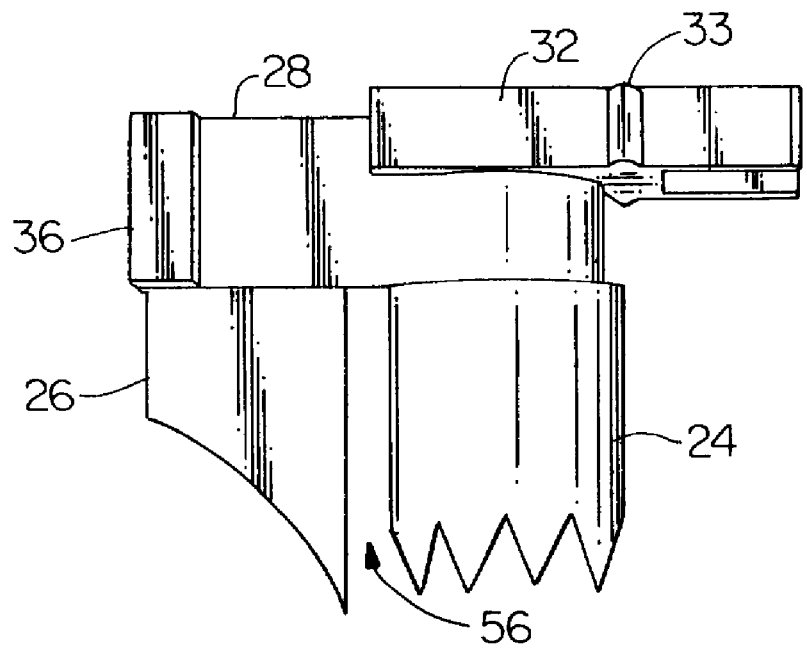
FIG. 3 is a side elevation of the slitter punch of this embodiment.

With reference to the Drawing, FIG. 1 illustrates the operative portion of a bag machine or similar punching apparatus 10 for forming holes and slits in a plastic film 11. An apertured backing plate 12 supports the film 11, and has a round opening 13 and a slot opening 14, with which a hole punch and slitter blade are aligned. A reciprocating mechanism 15 has a shaft 16 that moves up and down with respect to the backing plate, and a vertical channel 17 is situated distally of the shaft 16. A slitter punch and quick adapter assembly 18, according to one embodiment of this invention, is fitted onto a threaded end of the shaft 16, and serves as the cutter head for the punching apparatus 10. As shown, a slitter punch unit 20 has a base plate 22, with a circular hole punch 24 and a slitter blade 26 that are aligned respectively with the openings 13 and 14. A T-shaped distal leg 28 of the slitter punch unit 20 rides up and down in the channel 17, and serves to maintain registry and alignment of the unit 20. The slitter punch slidably seats in an adapter 30, which is threadably attached to the bottom end of the shaft 16.

Figure 4:
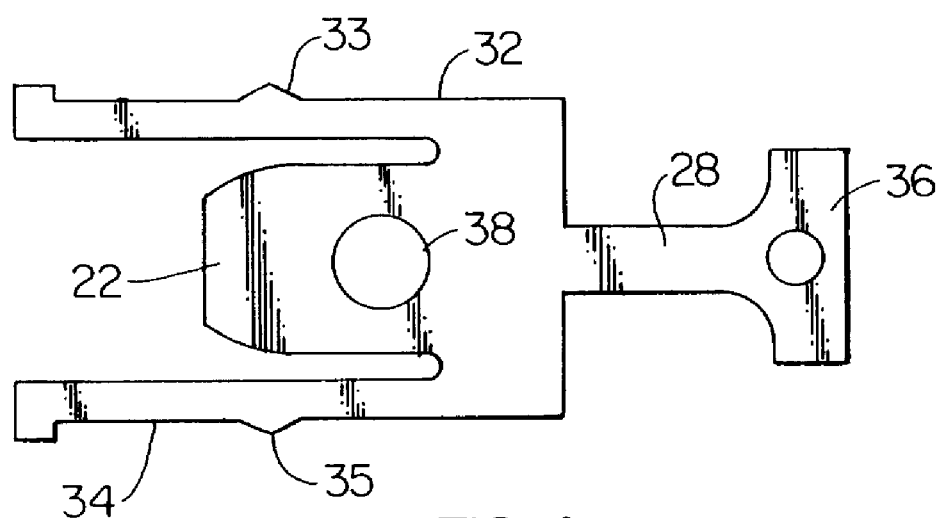
FIG. 4 is a top plan view of the slitter punch of this embodiment.

The slitter punch unit 20 is shown in more detail in FIG. 2, and is also shown in FIGS. 3 and 4. The unit of this embodiment is unitarily formed, e.g., molded of a plastic resin. Preferably a durable semi-rigid material is used, such as Delrin or another acetal homopolymer. The invention is not limited to that material. The hole punch 24 is generally cylindrical, and extends downward from the base plate 22. The hole punch 24 here has a hollow barrel portion and a ring of triangular cutting teeth at its bottom end. The slitter blade 26 is aligned generally radially with the punch 24, and extends downward from the T-shaped leg 28, which is united with the base plate 22. There are left and right arms 32, 34 that are joined to the base plate on a distal portion of the base plate 22. These proceed parallel to one another in the proximal direction and are spaced a short distance from the sides of the base plate 22. Free ends of the arms 32, 34 project somewhat beyond the end of the base plate 22. There are ridge shaped detents 33, 35 respectively on the outer sides of the arms 32, 34.

As shown, there is a square end or foot portion 36 at the distal end of the T-shaped leg 28. Also, an opening 38 extends through the base plate 22 and through the barrel of the punch 24, and permits air to be forced through the hole punch 24.

The adapter 30 in this embodiment, shown in FIG. 2, is formed of a metal extrusion 40, e.g. extruded aluminum. A T-channel 42 extends proximally-distally in the extrusion, with a gap 44 at the bottom side of the adapter 30. The gap 44 has a width sufficient to accomodate the diameter of the punch 24 and the width of the slitter blade 26. The T-channel also has side recesses 46, 48 at the left and right sides, which are defined by the inwardly directed flanges which also define the gap 44. Vertical recesses or hollows 50, 50 are formed in the recesses 46, 48 which serve to receive the detents 33, 35 of the slitter punch unit 20. The hollows can be created by milling a vertical opening along the side walls of the recesses 46, 48.

As also shown, there is a threaded opening 52 in the top of the adapter 30 to attach to the threaded end of the shaft 16. In this embodiment, the profile of the extrusion is as shown so that material is relieved at left and right sides at the top, leaving a thicker central portion 54.

The base plate 22 and the resilient arms 32 and 24 of the slitter punch 20 create a generally bar-shaped profile that generally matches the channel shape of the T-channel 42. This permits the slitter punch unit 20 to slide horizontally into the adapter 30, and click into the proper location when the detents 33, 35 mate with the hollows 50, 50. The free ends of the arms 32, 34 protrude from the proximal side of the adapter 30, and can be accessed by the operator. The operator can press the arms 32, 34 slightly toward one another to disengage the detents 33, 35 from the corresponding hollows 50, 50, and then pull the unit 20 from the adapter 30 to remove it. Only a few seconds are required to remove the worn unit and replace it with a fresh slitter punch unit 20. By comparison, it requires between three and five minutes per cutting head to remove and replace the punches and slitters of the prior art. In the present arrangement, the operator does not need to unscrew any of the cutting parts from the punch apparatus 10. This also means that the operator does not need to touch any of the cutting parts of the slitter-punch unit 20, but only the proximal ends of the resilient arms 32, 34. The operator does not need to reach beneath the cutting assembly to change out the slitter-punch unit 20, which reduces the risk of injury.

The slitter-punch units can be molded with a pre-set gap 56 i.e., between the barrel of the punch 24 and the proximal side of the slitter blade 26, at any desired specific distance. Typically these can be ¼ inch, 5/16 inch, or ⅜ inch. The units 20 can be molded with hole punches of any of various barrel diameters, e.g., ½ inch or ⅝ inch. As aforesaid, the slitter punch unit can be molded entirely out of plastic resin. The slitter-punch units can be color coded, with different dye colors added to the plastic to identify certain gap sizes and certain barrel diameters. Preferably, an assortment of slitter punch units can be provided so that the gap size can be changed for different hole punching operations, i.e., for different film thicknesses or different film materials.

Figure 5:
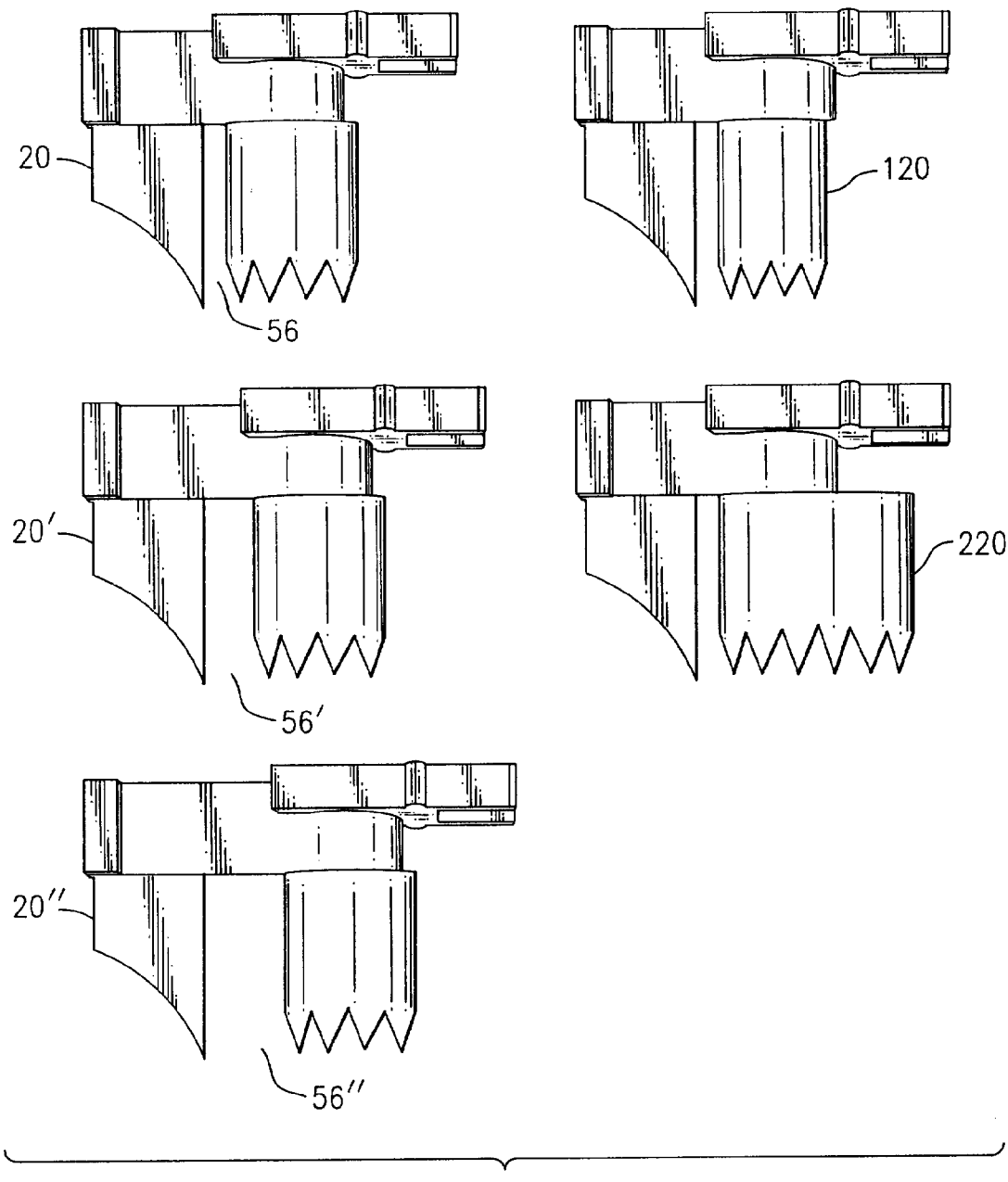
FIG. 5 shows an assortment of slitter punch units having varying barrel sizes and barrel-blade gap lengths.

FIG. 5 shows a variety of slitter-punch units, with slitter-punches 120 and 220 having smaller or larger barrel diameters, and with slitter punches 20, 20' and 20" having progressively larger gaps 56, 56', 56".

With color-coded slitter-punch units, the operator can verify, at a glance, whether the proper slitter-punch is in use, even when the equipment is running.

The invention is not limited to the shapes that are shown here. The slitter punch unit 20 and the adapter 30 can have any of a variety of shapes and sizes, with the various slots having a profile suitably selected. Also, the slitter punch may be unitarily formed of a material other than a plastic resin. Terms of orientation, such as up, down, left, right, proximal and distal, are used to assist in explaining the invention as shown in the Drawing, and are not intended as limitative. The adapter and slitter punch of this invention could be used in any orientation.

While this invention has been described in detail with reference to selected preferred embodiments, it should be recognized that the invention is not limited to those embodiments. Rather, many modifications and variations will present themselves to persons skilled in the art without departing from the scope and spirit of the invention, as defined in the appended claims.

I claim:

1. A slitter-and-hole-punch and quick change adapter combination which is adapted for use as a slitter punch cutting head for apparatus for punching holes and slits in a web of film material, said apparatus including an apertured backing plate on which said film is supported and reciprocating means for holding the slitter punch cutting head in registered alignment with said film and with corresponding apertures in said backing plate, and for moving said slitter punch cutting head in a direction that is substantially normal to said backing plate on which the film material is supported; wherein the slitter-and-hole-punch includes a base member, a hole punch unitarily formed with the base member and extending downward, a slitter blade unitarily formed with said base member and positioned distally of said hole punch and extending downward, and left and right resilient arms unitarily formed at left and right sides of the base member and having free ends that project proximally of said base member, each said resilient arm having a detent member formed thereon, said base and resilient arms defining a generally bar-shaped profile across a proximal-distal direction; and said quick adapter including a block having means thereon for attaching to said reciprocating means and a T-channel formed on a lower side with a passage of sufficient width to accommodate said hole punch and said slitter blade, and with side recesses to accommodate said resilient arms, said side recesses each having a cooperating hollow formed therein to receive the respective detent of one of the associated resilient arms.

2. The combination of claim 1 wherein said slitter-and-hole-punch is molded of a low-friction semi-rigid resin material.

3. The combination of claim 1 wherein said slitter-and-hole-punch includes a T-shaped member unitarily formed with said base plate and projecting distally therefrom, said T-shaped member carrying said slitter blade.

4. The combination of claim 1 wherein said combination includes a plurality of interchangeable ones of said slitter-and-hole-punch, each having a respective size of gap between the slitter blade and the hole punch.

5. The combination of claim 4, wherein said plurality of said slitter-and-hole-punches are color coded so that the slitter-and-hole-punches of each particular gap size are colored a respective color.

6. The combination of claim 1 wherein said quick adapter is formed of an aluminum extrusion having a T-shaped void at its lower side and having a central bar at its upper side with voids formed at left and right sides thereof.

* * * * *